Figure 1:
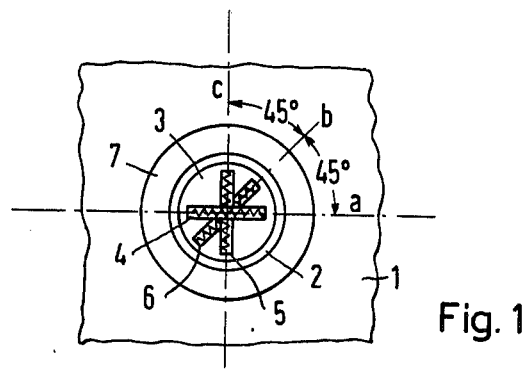

United States Patent [19] [11] 4,155,264
Bender et al. [45] May 22, 1979

[54] METHOD OF DETERMINING INTERNAL STRESSES IN STRUCTURAL MEMBERS

[75] Inventors: Norbert Bender, Nüremberg; Gerhard Hofer, Röttenbach; Olaf Lenz, Molfsee; Erwin Stücker, Essen, all of Fed. Rep. of Germany

[73] Assignee: Kraftwerk Union Aktiengesellschaft, Mulheim, Fed. Rep. of Germany

[21] Appl. No.: 906,633

[22] Filed: May 16, 1978

[30] Foreign Application Priority Data

May 18, 1977 [DE] Fed. Rep. of Germany ....... 2722655

[51] Int. Cl.² .............................................. G01N 1/04
[52] U.S. Cl. ..................................................... 73/783
[58] Field of Search .......................... 73/768, 783, 760

[56] References Cited

U.S. PATENT DOCUMENTS

| 3,765,230 | 10/1973 | Bohm et al. | 73/783 X |
| 3,803,905 | 4/1974 | Wolf et al. | 73/783 X |
| 3,943,758 | 3/1976 | Wolf et al. | 73/783 X |

Primary Examiner—Jerry W. Myracle
Attorney, Agent, or Firm—Herbert L. Lerner

[57] ABSTRACT

Method for determining internal stresses in structural members in machine or apparatus manufacturing by machining, around a measuring location provided with strain gages, a circular slot into the surface of the structural member that is to be measured, measuring changes in strain of the core of the measuring location left standing, and calculating the internal stresses from the measured strains and a depth-dependent decay function determined on a calibrating material sample, the improvement therein affording the determination of internal stresses in the structural members at depths greater than about 5 mm, includes the steps of mechanically removing the measuring-location core down to a new surface at the base of the circular slot, securing a strain gage to a new measuring location at the new surface, machining another circular slot around the new measuring location, measuring changes in strain of the core of the new measuring location left standing while measuring changes in strain thereof and repeating the foregoing steps for respective slot depths until a given depth at which internal stresses in the structural members are to be determined is reached, a separate depth-dependent decay function being determined on a calibrating material sample for each new measuring location core.

1 Claim, 4 Drawing Figures

METHOD OF DETERMINING INTERNAL STRESSES IN STRUCTURAL MEMBERS

The invention relates to a method for determining internal stresses in structural members in machine and apparatus manufacturing, by milling, around a measuring location equipped with strain gages, a circular slot into the surface of the structural member that is to be measured; measuring variations in strain of the core of the measuring location left standing; and determining the internal stresses from the measured strains and a depth-dependent decay function determined on a calibrating-material sample.

Such a procedure is known from the German Published Prosecuted Application DT-AS No. 2 016 118. The internal stresses residing in a workpiece due to the fabrication or machining thereof are made accessible in the area of the workpiece exposed by the machined-in circular slot, referred to hereinafter as the measuring-location core, and can be picked up or detected by strain gages on the surface of this measuring-location core, generally in two mutually orthogenal or perpendicular directions and a third direction which is inclined to the other two directions by an angle of 45°. The internal stresses can then be calculated in the three predetermined directions according to the following relationship:

$$\sigma = f(E, K(z), d\epsilon/dz).$$

where $\sigma$ are the internal stresses, E Young's modulus of the workpiece to be measured, $d\epsilon$ the measured strain change or variation, dz the stepwise machined slot depth, and K a decay function which takes into consideration the fact that with increasing milling depth the reaction of the strain gage to strain changes in the measuring-location core diminishes. This decay function is determined in a calibration test with predetermined external stresses on a calibrating material sample being the same geometry of the measuring location as for the original measurement.

Since, with increasing slot depth, however, strain changes of the measuring-location core react up to the strain gages on the surface of the measuring location core to an ever decreasing extent and can no longer be picked up or detected through the decay function either, this measuring method generally yields valid information only for slot depths of up to about 5 mm.

It is therefore an object of the invention to provide this very simple and, particularly, very accurate measuring method whereby internal stresses can be determined therewith also at very great work-piece depths.

With foregoing and other objects in view, there is provided, in accordance with the invention, a method for determining internal stresses in structural members in machine or apparatus manufacturing by machining, around a measuring location provided with strain gages, a circular slot into the surface of the structural member that is to be measured, measuring changes in strain of the core of the measuring location left standing, and calculating the internal stresses from the measured strains and a depth-dependent decay function determined on a calibrating material sample, the improvement therein affording the determination of internal stresses in the structural members at depths greater than about 5 mm, which comprises the steps of mechanically removing the measuring-location core down to a new surface at the base of the circular slot, securing a strain gage to a new measuring location at the new surface, machining another circular slot around the new measuring location, measuring changes in strain of the core of the new measuring location left standing while measuring changes in strain thereof and repeating the foregoing steps for respective slot depths until a given depth at which internal stresses in the structural members are to be determined is reached, a separate depth-dependent decay function being determined on a calibrating material sample for each new measuring location core.

By repeating the machining of the circular slot and the measuring operation, in this manner, step by step in steps of about 5 mm depth each and by removing the measuring location core left standing, it is thus possible to determine internal stresses at greater work-piece depths than about 5 mm in a relatively simple manner.

Other features which are considered as characteristic for the invention are set forth in the appended claim.

Although the invention is illustrated and described herein as embodied in method of determining internal stresses in structural members of machine and apparatus manufacture, it is nevertheless not intended to be limited to the details shown, since various modifications may be made therein without departing from the spirit of the invention and within the scope and range of equivalents of the claim.

Figure 2:
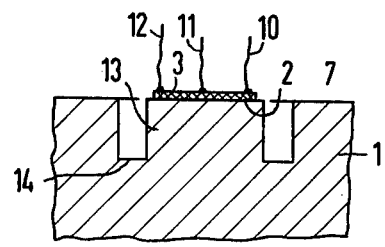
Figure 3:
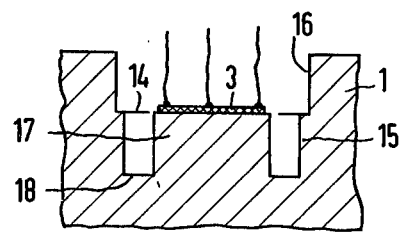
Figure 4:
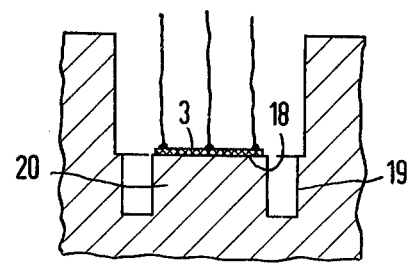

The invention, however, together with additional objects and advantages thereof will be best understood from the following description when read in connection with the accompanying drawings in which:

FIG. 1 is a fragmentary top plan view of a structural member at the measuring location thereof; and FIGS. 2 to 4 are cross-sectional views of FIG. 1 taken at different stages of the method of the invention at respectively greater slot depths in the structural member.

Referring now to the drawing and first, particularly, to FIGS. 1 and 2 thereof, there is shown cemented onto a workpiece or structural member 1 to be measured, a circular measuring location 2 thereof, a strain gage 3 which supports three measuring grids 4, 5 and 6, the measuring grids 4 and 5 being at right angles to each other, and the measuring grid 6 being at an angle of 45° to the two measuring grids 4 and 5.

When a circular slot 7 is machined around the circular measuring location 2, which can be effected, for example, by milling with a crown drill, strain changes or variations $d\epsilon$ are then measured in the three measuring directions a, b, c, by the strain gage 3. As can be seen from FIG. 2, the measuring leads 10, 11 and 12, which are soldered to the strain gage 3, lead to a conventional non-illustrated measuring instrument.

Since changes or variations in strain react on the strain gage 3 and yield a measurable result only up to a given depth of the circular slot 7, the measuring location 13 which remains standing and surrounded by the circular slot 7, is mechanically removed in accordance with the invention, for, by drilling or milling down to the base or bottom surface 14 of the slot 7. As can be seen from FIG. 3, the strain gage 3 is recemented onto the thus obtained new measuring surface 13 and a new circult slot 15 is milled into the structural member 1, starting from the new surface 14. To facilitate the application of the strain gage and the machining of the new circular slot 15, it may be advantageous to provide, simultaneously with removing the measuring location core 13, a larger recess 16 overall in the workpiece to be measured. While the circular slot 15 is machined step by step, the strain changes are measured in the same manner by means of the strain gage 3. A new measuring location core 17 is then obtained and for this second stage of the method, the corresponding decay function must likewise be determined conventionally to obtain the corresponding internal stress values of the workpiece in this depth section.

As can be seen from FIG. 4, the measuring and milling procedure can be repeated step by step until the given or desired measuring depth is reached. Starting from the second measuring stage according to FIG. 3, the measuring location core 17 left standing must first be removed down to the bottom surface 18 of the circular slot 15, so that the new measuring surface 18 is obtained according to FIG. 4. The strain gage 3 must then be recemented on the surface 18 and a new circular slot 19 must be machined around the measuring location core 20. In this case, too, a separate decay function must be determined for this measuring range.

With the hereinaforedescribed method of the invention, it is therefore possible to obtain very accurately internal stresses, in a relatively simple manner, also at greater depths than heretofore possible in highly stressed structural members such as reactor pressure vessels, for example, so that reliable declarations or assertions regarding proper fabrication or production and future reliability of the structural member can be made.

There is claimed:

1. Method for determining internal stresses in structural members in machine or apparatus manufacturing by machining, around a measuring location provided with strain gages, a circular slot into the surface of the structural member that is to be measured, measuring changes in strain of the core of the measuring location left standing, and calculating the internal stresses from the measured strains and a depth-dependent decay function determined on a calibrating material sample, the improvement therein affording the determination of internal stresses in the structural members at depths greater than about 5 mm, which comprises the steps of mechanically removing the measuring-location core down to a new surface at the base of the circular slot, securing a strain gage to a new measuring location at the new surface, machining another circular slot around the new measuring location, measuring changes in strain of the core of the new measuring location left standing while measuring changes in strain thereof and repeating the foregoing steps for respective slot depths until a given depth at which internal stresses in the structural members are to be determined is reached, a separate depth-dependent decay function being determined on a calibrating material sample for each new measuring location core.

* * * * *